United States Patent [19]
Wetzel

[11] Patent Number: 6,090,423
[45] Date of Patent: Jul. 18, 2000

[54] METHOD FOR ROASTING LEGUMES

[76] Inventor: Clifford C. Wetzel, 2575 W. Washington Rd., Ithaca, Mich. 48847

[21] Appl. No.: 09/306,127

[22] Filed: May 6, 1999

Related U.S. Application Data

[62] Division of application No. 08/993,534, Dec. 18, 1997, Pat. No. 5,946,815.

[51] Int. Cl.⁷ ..................................................... A47J 37/04
[52] U.S. Cl. ........................... 426/233; 426/466; 99/476; 99/483; 34/499; 34/500; 34/520
[58] Field of Search ............................. 34/418, 427, 437, 34/438, 497, 500, 519, 520, 549, 555, 560, 573, 575, 60, 68, 132, 135, 141, 179, 180, 183, 499; 99/323.4, 348, 355, 357, 404, 409, 423, 427, 443 C, 443 R, 447, 470, 473, 477; 426/233, 465, 466, 629, 634

[56] References Cited

U.S. PATENT DOCUMENTS

| | | | |
|---|---|---|---|
| 1,766,033 | 6/1930 | Meakin | 422/273 |
| 2,626,856 | 1/1953 | Alles | 422/229 |
| 4,071,962 | 2/1978 | Saeman | 34/135 |
| 4,135,308 | 1/1979 | Benson | 34/344 |
| 4,592,150 | 6/1986 | Schnupp | 34/136 |
| 4,939,346 | 7/1990 | Bailey et al. | 219/388 |
| 5,609,902 | 3/1997 | Inakuma et al. | 426/466 |
| 5,681,607 | 10/1997 | Maki et al. | 426/595 |
| 5,718,164 | 2/1998 | Finken et al. | 99/355 |

OTHER PUBLICATIONS

Determining Optimal Heat Treatment of Soybeans by Measuring Available Lysine Chemically and Biologically with Rats to Maximize Protein Utilization by Ruminants—by Faldet, Satter, and Broderick, American Institute of Nutrition—1992 pp 151–160.

Feeding Whole Soybeans, Soy Hulls and Soybean Meal, by Satter, Faldet, and Socha. Presented at Proceedings of Symposium titles "Alternative Feed for Dairy and Beef Cattle", Sep. 22–24, 1991, St. Louis, MO. pp. 22–33.

Procedures for Measuring the Quality of Heat–Treated Soybeans, by Hsu and Satter, 1995 Journal of Dairy Science, vol. 78, pp. 1353–1361.

New Test Puts Heat on to Roast Soybeans Properly, by Morrow. Wisconsin Agriculturist, Mid–Mar. 1993, pp. 8–10, 12, 13, and 46.

Young's Nutri–Notes, Roasted, Extruded, Flaked or Raw . . . Cracked, Whole, or Ground . . . Regardless of How they are Processed or Fed . . . Soybeans are Soybeans . . . Right?? 2 pages Mar. 2, 1995.

Young's Nutri–Notes, Effects of Processing of Soybeans on Oct. 21, 1994 2 pages.

Young's Nutri–Notes, Effects of Processing of Soybeans on Fat Release. Dec. 30, 1994 1 page.

*Primary Examiner*—Pamela A. Wilson
*Attorney, Agent, or Firm*—Reising, Ethington, Barnes, Kisselle, Learman & McCulloch, P.C.

[57] ABSTRACT

A method for roasting legumes such as soybeans to enhance their nutritional properties. Raw legumes are introduced to a roaster having an oven section and a steeping section downstream of the oven section. The raw legumes are heated to a selected roasting temperature in the oven section as they are moved through the oven section to and through the steeping section. Throughout the passage of the legumes through the oven and steeping sections the legumes are mixed continuously.

12 Claims, 3 Drawing Sheets

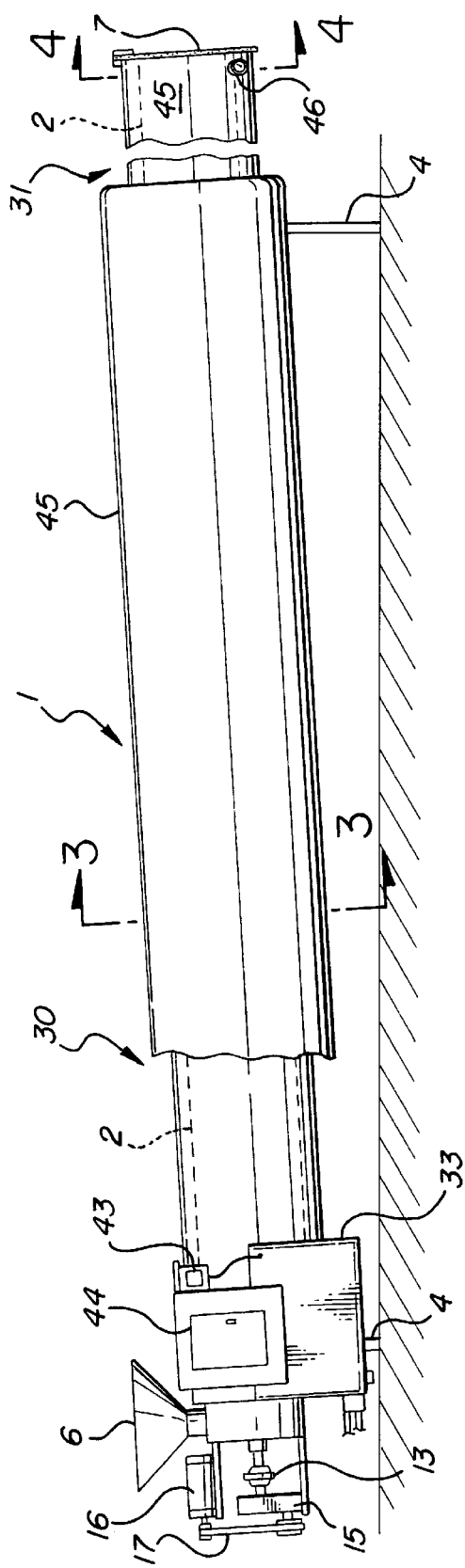
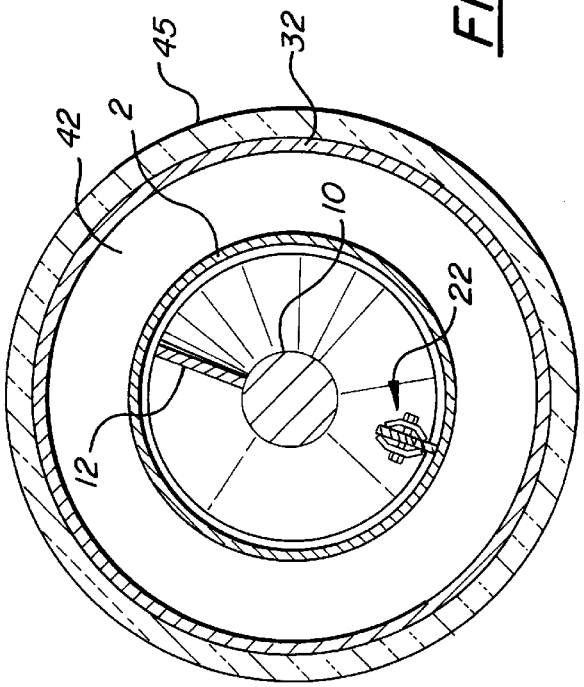

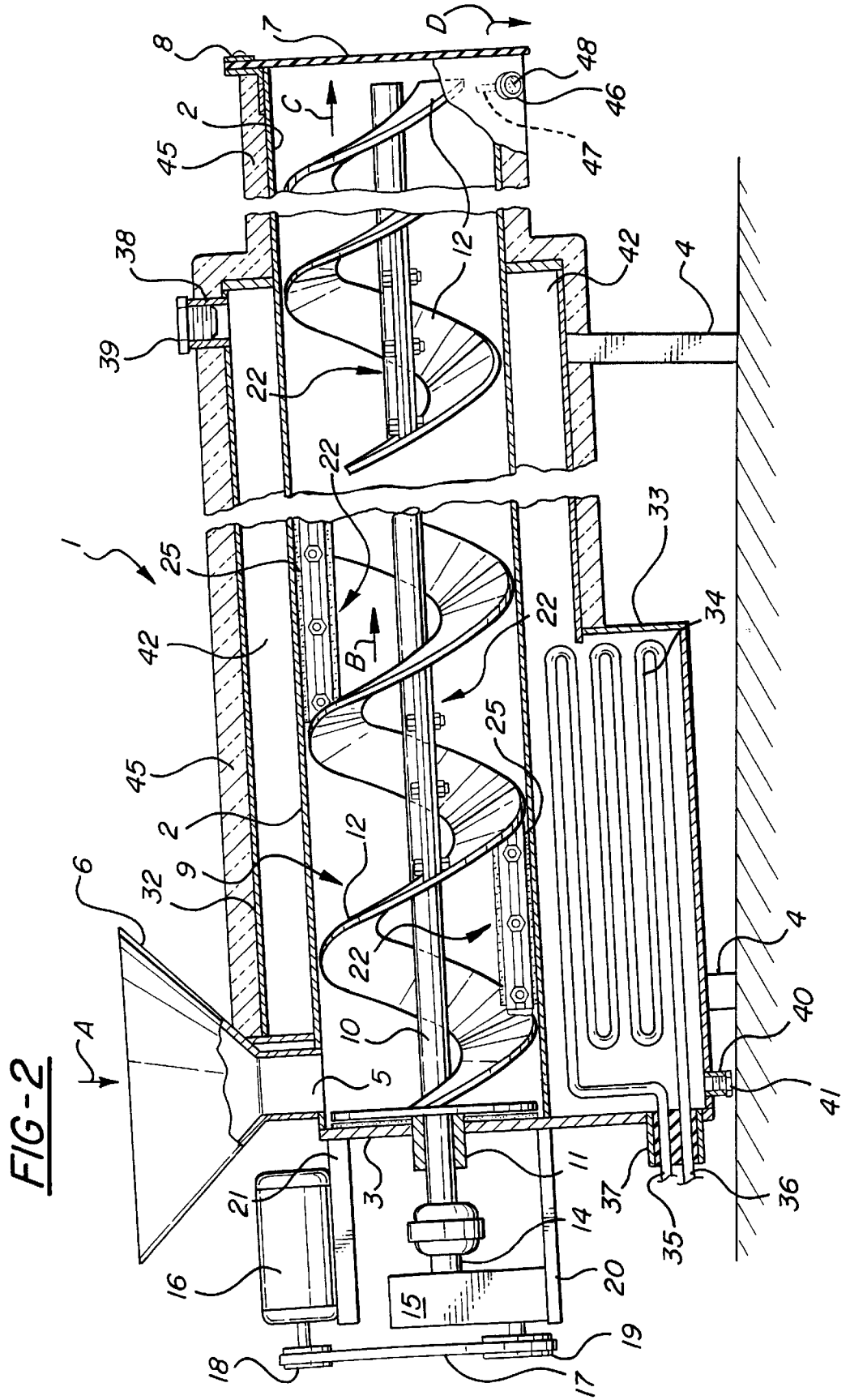

METHOD FOR ROASTING LEGUMES

This application is a division of application Ser. No. 08/993,534 filed Dec. 18, 1997, now U.S. Pat. No. 5,946,815.

This invention relates to apparatus and methods for roasting legumes and more particularly to such apparatus and methods that are especially adapted for use in the roasting of soybeans that are to be incorporated into cattle feed.

BACKGROUND OF THE INVENTION

It is well known that cattle feed consisting of or including soybean meal made from roasted soybeans can increase the amount of protein escaping degradation (bypass protein) in the rumen of lactating dairy cows, thereby enhancing the nutritional value of such cattle feed. However, insufficient roasting of the soybeans results in a diet supplement which is little or no better than meal produced from untreated soybeans, whereas over roasting of the beans does not enhance their nutritional value but does result in increased costs resulting from the excess roasting time and fuel consumption.

A test procedure has been established to enable the bypass protein content in roasted soybeans to be determined. The test results are expressed in terms of the protein dispersibility index (PDI). A PDI of between 9.0 and 11.0 is achieved when the roasting is optimum.

A principal object of apparatus and methods according to the invention is to provide for the roasting of soybeans or other legumes in such manner as to effect optimum enhancement of the nutritional value or PDI thereof.

SUMMARY OF THE INVENTION

The roasting of soybeans or other legumes according to the invention comprises introducing raw soybeans into one end of a cylindrical housing within which is a rotatable auger having a helical vane which engages the soybeans and moves them from the inlet end of the housing to an outlet at its opposite end. A substantial portion of the housing is encircled by a heat exchange jacket through which a heating medium circulates from and back to a reservoir. The jacket terminates between the opposite ends of the housing, and both the jacket and that portion of the housing which extends beyond the jacket are encircled by thermal insulating material.

At the outlet end of the housing is a flap which overlies the discharge end and minimizes the escape of heat therefrom. The flap is formed of flexible material that has good resistance to deterioration by heat and is sufficiently pliable to be displaceable by the beans without interfering with their discharge from the housing.

The auger by means of which the beans are advanced from the inlet end of the housing to the discharge end thereof has a helical flight or vane the diameter of which is sufficiently less than the inside diameter of the housing to ensure nonbinding rotation of the auger within the housing. Between adjacent convolutions of the auger vane are circumferentially spaced, longitudinally extending mixing blades which tumble the beans as they traverse the housing and mix them thoroughly so as to obtain substantially uniform heating of each bean.

That part of the housing which is encircled by the heat exchange jacket constitutes the oven section of the apparatus, whereas that part of the housing which extends beyond the oven section constitutes the steeping or heat permeation section of the apparatus. In the oven section the beans are heated to the preselected roasting temperature and mixed so that virtually all beans are exposed to the roasting heat. In the steeping section no additional heat is applied, but the roasted beans continue to be mixed and thus transfer heat to each other so that each bean is heated thoroughly throughout and has a temperature which corresponds substantially to that of every other bean.

The rate of travel of the beans through the oven and steeping sections is so selected that each discharged bean will have been roasted at a temperature and for such length of time as to have the optimum protein dispersibility index.

THE DRAWINGS

Apparatus constructed in accordance with the preferred embodiment of the invention and for practicing the method according to the invention is disclosed in the accompanying drawings wherein:

FIG. 1 is a fragmentary side elevational view of the roaster;

FIG. 2 is a fragmentary, longitudinal sectional view of the apparatus shown in FIG. 1;

FIG. 3 is a sectional view taken on the line 3—3 of FIG. 1;

THE PREFERRED EMBODIMENT

Figure 5:
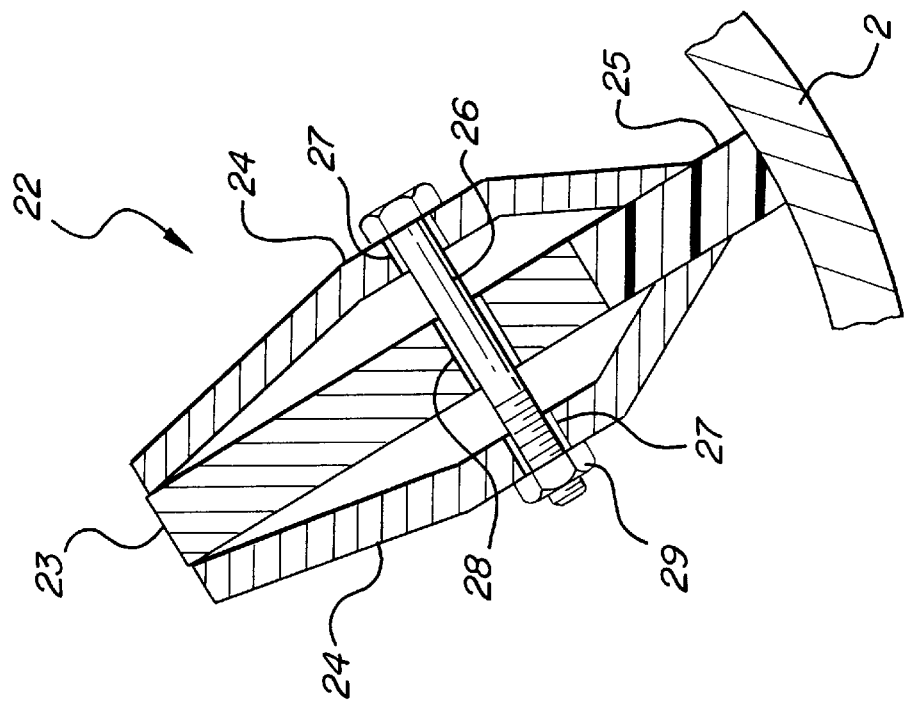
FIG. 5 is a greatly enlarged view of a portion of the apparatus shown in FIG. 3.
Figure 4:
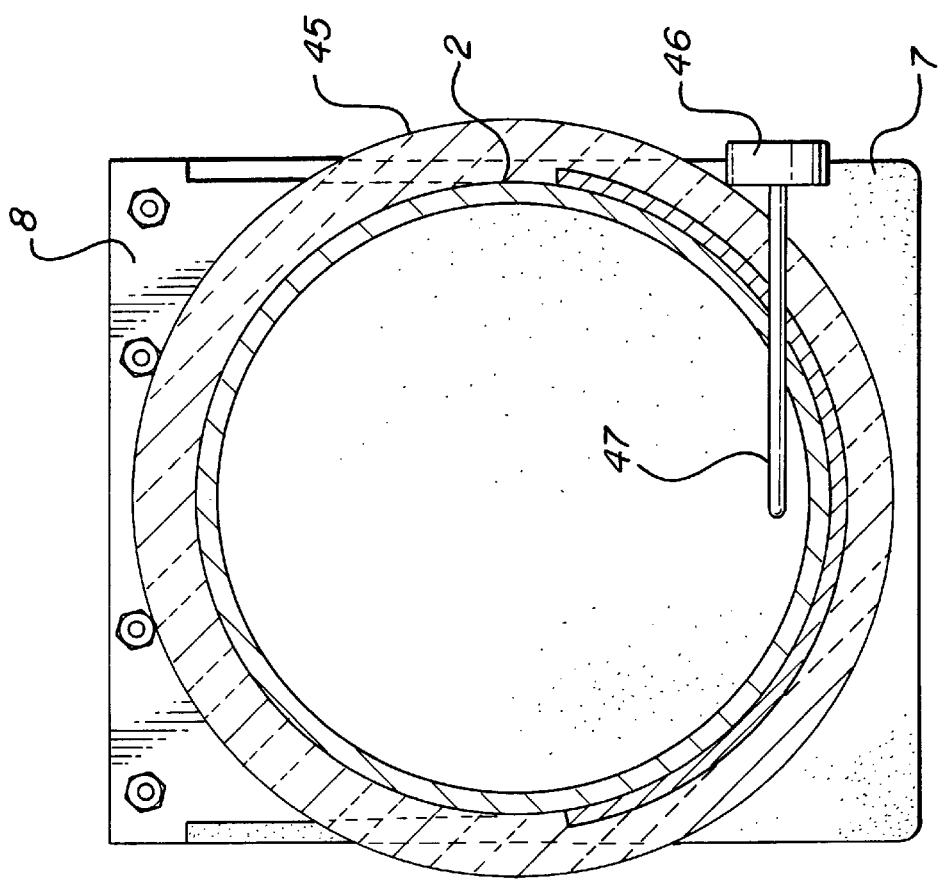
FIG. 4 is an enlarged sectional view taken on the line 4—4 of FIG. 1.

A roaster constructed in accordance with the preferred embodiment of the invention is designated generally by the reference character 1 and comprises an elongate, cylindrical housing 2 formed of heat transmitting material and having a closure wall 3 at one end. The housing 2 is supported at intervals along its length by (preferably adjustable height) supporting legs 4 and which are of different lengths so that the housing occupies a position that is inclined upwardly from its closed end 3 toward its opposite or outlet end. The extent of inclination will depend upon several factors which will be referred to subsequently.

In communication with the interior of the housing 2 and adjacent the closed end 3 thereof is an inlet opening 5 having a funnel 6 leading thereto. The opposite end of the housing 2 is covered by a flap 7 of pliable material suspended from a bracket 8 which is supported on the housing 2.

Rotatably accommodated in the housing 2 is a feed or advancing auger 9 comprising a shaft 10 journaled at one end in a bearing 11 supported by the end wall 3 and having a helical flight or vane 12 secured to and extending the length of the shaft 10. The shaft 10 is connected by a coupling 13 to the output shaft 14 of a speed reducing mechanism 15 which is driven by an electric motor 16 via a belt 17 trained around pulleys 18 and 19. The speed reducer 15 is supported on a shelf 20 and the motor 16 is supported on a similar shelf 21, both of which are mounted on the end wall 3.

Extending between and secured to adjacent convolutions of the auger flight 12 are mixer blades 22, each of which is identical. Each mixer blade comprises a strut 23 which parallels the shaft 10 and is welded or otherwise suitably fixed to adjacent flights. Each strut is flanked by a pair of retainers 24 of springy material. Gripped between the retainers 24 is a wiper strip 25 formed of polytetrafluoroethylene (PTFE), the outer end of each strip bearing lightly against the inner surface of the housing 2. Each strip 25 is maintained in snug engagement with its associated strut 23 by means of headed adjusting bolts 26 which extend through aligned opening 27 and 28, respectively, in the strut 23 and the retainers 24. Appropriate force is maintained on the strips 25 by adjustable nuts 29 at the free ends of the bolts 26.

Each mixer blade extends longitudinally of the roaster and parallels the shaft 10. Each wiper also is circumferentially displaced 900 from its adjacent mixer.

The roaster 1 is divided into two coaxial sections, one of which is an oven section 30 and the other of which is a heat permeating or steeping section 31 extending in prolongation of the oven section. The oven section includes a jacket 32 encircling the housing 2 from the inlet end thereof and extending toward, but terminating well short of the outlet. The jacket 32 has a reservoir 33 in which an electrically operated heating coil 34 of conventional construction is positioned. The coil has leads 35 and 36 extending externally of the reservoir through a sealed opening 37 for connection to a power source (not shown).

A filler tube 38 communicates with the interior of the jacket and normally is closed by a plug 39. A drain opening 40 communicates with the reservoir 33 and normally is closed by a plug 41. The jacket and reservoir 33 form an annular chamber 42 through which heated oil may circulate, the heat of the oil being transferred through the wall to the interior of the housing 2. The temperature of the oil may be controlled by an adjustable thermostat 43 in communication with the interior of the reservoir 33 and connected to conventional electrical controls (not shown) contained within a cabinet 44.

The jacket 32 and the chamber 42 extend approximately two-thirds the length of the housing 2 and define the oven section 30. The remainder of the housing 2, i.e., that part which projects beyond the oven section 30, constitutes the steeping section 31. Both the oven section 30 and the steeping section 31 are encircled by thermal insulation 45.

A typical roaster for treating three to four tons of soybeans per day has a roaster section of about twenty feet, a steeping section of about ten feet, and a uniform diameter of about fifteen inches. In any event, the volume of the roaster section preferably is greater than that of the steeping section.

To condition the apparatus for operation the roaster 1 is located in a position to receive the soybeans or other legumes that are to be treated. The inclination of the roaster initially is set at an angle of between about 3–5° to the horizontal. Preferably, the supporting legs 4 are vertically adjustable so as to enable the inclination of the roaster to be adjusted.

The reservoir 33 and the annular chamber 42 are filled with a fluid heating medium such as oil and such oil then is heated to a desired temperature of between about 350–380° F., for example. Preferably, the oil temperature is maintained within about ±2° throughout the process. Although oil is the preferred heating medium, it is possible to use air, steam, or any other suitable medium.

After the temperature of the oven has stabilized at the desired level, fresh legumes are introduced to the oven section of the housing 2 via the inlet 5 and the feed auger 9 is started and rotates continuously at a speed of between about 45–55 revolutions per hour (rph). As the beans advance through the oven section 30 from the inlet they are heated by the heat of the oil that is transmitted through the housing wall 2 and are thoroughly mixed so as to obtain substantially uniform heating of the beans.

Following movement of the heated beans from the oven section 30 to the steeping section 31, the beans continue to be moved by the auger toward the outlet end of the housing and continue to be mixed by the mixing blades 22. In the steeping section 31 of the roaster no external heating or cooling medium is supplied to the beans. However, due to their passage through the oven, the beans are at an elevated temperature, thereby enabling all of the beans to steep and become heat permeated. Although no external heat is applied in the steeping section, it is believed that moisture will be released from the beans in the form of steam and such steam will assist in delaying the cooling of the beans, thereby assisting in establishing a substantially uniform temperature throughout each bean.

As the beans approach the discharge end of the roaster they pass a thermometer 46 having a stem 47 which projects into the housing 2 and a gauge 48 on which a scale is provided. The thermometer enables the roaster operator to determine the temperature of the beans just prior to their discharge from the roaster. A temperature of between about 220–280° F. is acceptable.

As the beans reach the discharge end of the roaster, they will encounter the flap 7 which, although displaceable from the position shown in FIG. 2 to allow beans to exit the roaster, provides a barrier to the escape of heat from the housing. Consequently, heat is conserved while the beans become substantially uniformly heated throughout.

Beans that are discharged from the roaster may be collected in a suitable container (not shown) or delivered directly to a conveyor (not shown) and transported to an area for further processing or packaging.

Samples of beans discharged from the roaster may be analyzed to determine their PDI. If the PDI does not fall within the optimum range of 9– 11, any one or more of various adjustments may be made to the roaster so as to produce the optimum PDI. For example, the speed of rotation of the auger 9 may be adjusted, or the temperature of the heating oil may be adjusted, or the inclination of the roaster may be adjusted. The effect of these adjustments should be such as to provide sufficient time for the beans to be subjected to an elevated temperature so that each bean is neither under nor over roasted. A residence time of beans within the roaster of 1–1.25 hours and a discharge temperature of about 260° F. has produced satisfactory results.

Although the foregoing description has been concerned primarily with the roasting of soybeans, the apparatus may be utilized for the roasting of other legumes such as peanuts and corn, for example.

This disclosure is representative of a presently preferred embodiment of the apparatus and method, but is intended to be illustrative rather than definitive thereof. The invention is defined in the claims.

I claim:

1. A method of roasting legumes including introducing said legumes into a first section of a hollow housing via an inlet; advancing legumes in said housing from said inlet to an outlet; heating said legumes as they advance through said first section of said housing to a roasting temperature; delivering roasted legumes from said first section into a second section of said housing; advancing the roasted legumes through said second section of said housing to said outlet without the application to said legumes of an external head exchange medium thereby enabling said legumes to steep and discharging the roasted legumes from said second section of said housing via said outlet.

2. The method according to claim 1 including inclining said housing upwardly in a direction from said inlet to said outlet.

3. The method according to claim 1 including minimizing heat loss from said outlet.

4. The method according to claim 1 including measuring the temperature of legumes in said second section of said housing adjacent said outlet and maintaining said temperature at a selected level.

5. The method according to claim 4 including maintaining said temperature at said selected level by adjusting the heat applied to said legumes in said first section of said housing.

6. The method according to claim 4 including maintaining said temperature at said selected level by adjusting the rate at which said legumes are advanced through said housing.

7. The method according to claim 4 including maintaining said temperature at said selected level by inclining said housing upwardly in a direction from said inlet to said outlet.

8. The method according to claim 1 including mixing the legumes as they are advanced through said housing.

9. The method according to claim 1 including heating all of the legumes in said housing to a substantially uniform temperature.

10. The method according to claim 1 including advancing the legumes at a substantially uniform speed through both of said sections.

11. The method according to claim 1 wherein no cooling medium is applied in said second section to the legumes therein.

12. The method according to claim 1 wherein said legumes are soybeans and wherein roasted soybeans discharged from said second section have a protein dispersibility index of between 9.0 and 11.0.

* * * * *

UNITED STATES PATENT AND TRADEMARK OFFICE
CERTIFICATE OF CORRECTION

PATENT NO.  : 6,090,423
DATED       : July 18, 2000
INVENTOR(S) : Clifford C. Wetzel It is certified that error appears in the above-identified patent and that said Letters Patent is hereby corrected as shown below:

<u>Title page,</u>
Item [56], OTHER PUBLICATIONS, change "Young's Nutri-Notes, Effects of Processing of Soybeans on Oct. 21, 1994 2 pages" to -- Young's Nutri-Notes, Nutri-Nuggets, Roaster Soybeans, Soy-Check October 21, 1994 2 pages --.

<u>Column 3,</u>
Line 11, change "900" to -- 90° --;

<u>Column 4,</u>
Line 62, change "head" to -- heat --.

Signed and Sealed this

Eleventh Day of March, 2003

JAMES E. ROGAN
*Director of the United States Patent and Trademark Office*